May 28, 1968  C. G. BUSH, JR  3,384,934
MAGNETIC FASTENER
Filed Dec. 16, 1965

INVENTOR.
CLINTON G. BUSH JR.
BY
Nolte and Nolte
ATTORNEYS

United States Patent Office 3,384,934
Patented May 28, 1968

3,384,934
MAGNETIC FASTENER
Clinton G. Bush, Jr., Centre Island, N.Y., assignor to Elton Industries, Inc., New York, N.Y., a corporation of New York
Filed Dec. 16, 1965, Ser. No. 514,319
6 Claims. (Cl. 24—73)

ABSTRACT OF THE DISCLOSURE

The fastener for securing panels of relatively soft material to structures of ferromagnetic material, comprising a disc-shaped permanent magnet to which the vertex of a conically shaped wire spiral is firmly attached.

This invention relates generally to a fastening device for use in mounting insulated or covering panels to a metallic ceiling or wall, and in particular relates to a magnetic headed fastener which can be readily placed into insulation paneling of relatively soft material which is then secured to a metallic wall or ceiling, or to a wall or ceiling having metallic supporting means, by the retaining magnetic force.

In buildings, both commercial and residential, it is frequently desirable to mount insulating paneling such as that made of cork or a similar relatively soft material, against a wall or ceiling surface, to provide for insulation of heat and sound. The installation of such insulating material may become quite complex and costly in the cases in which the ceilings or walls are metallic in construction, or in which metallic supporting beams extend from the ceiling or wall.

It is, therefore, an object of this invention to provide a fastening device which greatly simplifies the installation of such insulating panels to ceiling and wall structures.

It is a further object of this invention to provide a fastening device in the form of a screw which may be readily inserted into an insulating panel and which enables ready connection of the insulating panel to the wall or ceiling construction.

It is yet a further object of this invention to provide a fastening device which enables the assembly of insulating or covering surfaces to the surface of a metallic ceiling which avoids the use of adhesives or other fastening devices, such as nails or the like.

In particular, it is an object of the present invention to provide for a device which enables the formation of a wall or ceiling for placement of insulating panels of relatively soft material thereto, in which the panels can be placed in position very rapidly with a minimum of inconvenience so that the costs of mounting an assembly are lower than those involved in presently known constructions.

Furthermore, it is an object of the present invention to provide a device which enables the mounting of insulating or covering panels to ceiling or wall construction which can be quickly and easily performed by relatively unskilled personnel, and which permits the arrangement of such insulating panels to be changed many times at a minimum cost and inconvenience.

According to the present invention, a conically shaped wire spiral with a sharpened or pointed base end, has affixed to the vertex end thereof, a permanent magnet.

In use, the pointed base end of the conical spiral is screwdriven into the relatively soft insulating panel, until substantially the entire spiral lies within the panel. Due to the volute-like shape of the wire spiral, the permanent magnet head remains exposed on the top surface of the insulating panel with an increased stability and is then mounted against the metallic portion of the ceiling or wall so as to retain by magnetic force, the insulating panel to the wall or ceiling.

The invention is illustrated by way of example in the accompanying drawings which form part of the application and in which.

Figure 1:
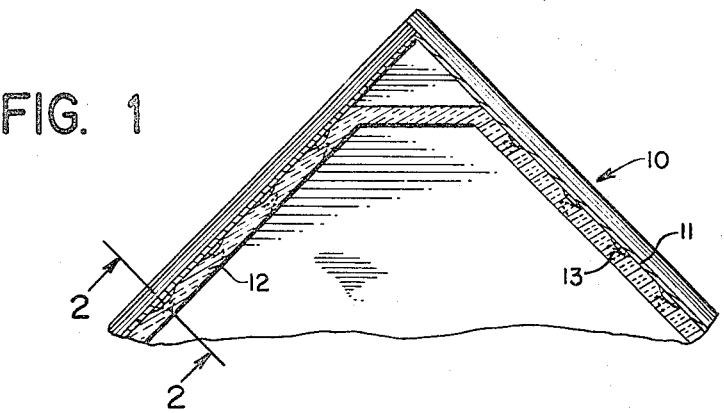
FIG. 1 shows a corner of a structure in which insulating material panels are secured to the roof of a structure, by use of the inventive fastening device.

Referring to FIG. 1, there is shown a typical application of the magnetic fastening device according to the present invention.

A portion of a roof 10 is shown, in which a corrugated metallic facing 11 is secured to the inner surface of the wall or ceiling. An insulating paneling or sheeting 12, which may be of any conventional type used as insulating material such as cork and the like, and which may provide, for example, heat and/or sound insulation, is mounted in position against the metallic facing. In accordance with this invention, the insulating means are held in the desired position by means of a magnetic fastening device 13 which is inserted into the insulating panel and which creates a magnetic force between the magnet and the metallic lining 11 to thereby retain the insulating sheeting or panel 12 to the metallic surface 11.

To remove the insulating panels, all that need be done is to pull the paneling 12 to overcome the magnetic retaining force between the magnetic fastening device 13 and the ceiling 11. Thus it can be seen that by the use of the inventive magnetic fastener, the paneling may be mounted and removed from the ceiling or wall with a minimum of equipment and labor.

Figure 2:
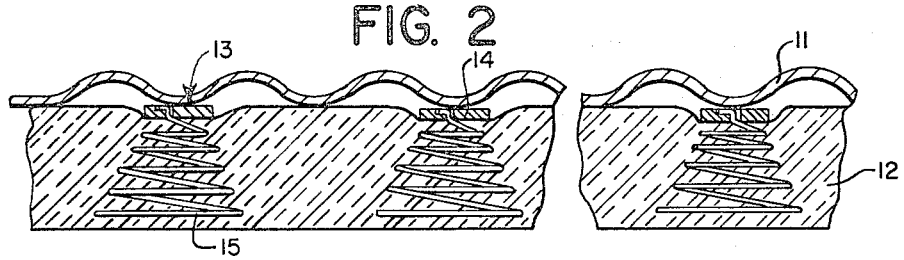
FIG. 2 is a section view taken along line 2—2 of FIG. 1 and showing the manner in which the inventive fastening device is secured to the insulating panel and roof.

This manner in which the magnetic fastening device is employed with the insulation paneling 12 is shown more clearly in FIG. 2, in which the metallic ceiling surface 11 is shown to be corrugated in form. It is to be understood that a flat metallic surface, or metallic beams extending from the wall or ceiling would be equally suitable for use with the magnetic fastening device according to this invention.

The magnetic fastener device 13 consists primarily of two sections. A permanent magnet 14 which may be in the form of a relatively flat circular disc, as shown, has connected thereto the vertex and of a conically shaped wire or strip spiral 15 which may be pointed at the free base end thereof to achieve easier driving into the insulating paneling 12. The top surface of the permanent magnet 14 is embedded into the insulation panel 12 by twisting the spiral 15 of the fastening device 13 into the panel 12 until the top surface of magnet 14 is even with the top surface of the paneling 12. When the magnet is so positioned, the entire fastening device 13 is securely embedded within the relatively soft panel 12 by means of the increased base diameter of the conical wire spiral 15, which is preferably larger than the diameter of the magnet 14.

The magnetic fastening devices 13 are substantially equally spaced along the surface of the insulation paneling, so that sufficient and uniform magnetic attractive force can be achieved between the insulating panel 12 and the ceiling support member 11.

The conical wire spiral 15 is attached to the magnet, by any well known means such as soldering or welding, within a passageway 16 in the magnet which is substantially L-shaped in cross section, through which the top of the helical section 17 is inserted.

Figure 3:
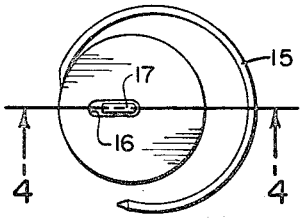
FIG. 3 is a top plan view of a fastening device according to this invention.
Figure 4:
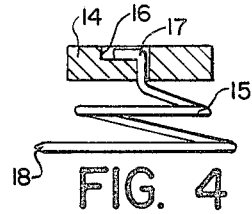
FIG. 4 is a sectional view taken along line 4—4 of FIG. 3.

In the embodiment shown in FIGS. 2, 3, and 4, the conical securing spiral 15 comprises essentially a wire of circular cross-section having the base end 18 thereof, formed into a sharpened point to facilitate the embedding of the securing means into the surface of the relatively soft insulation paneling 12.

Figure 5:
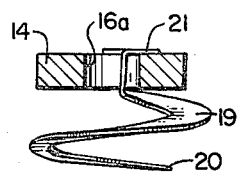
FIG. 5 is a view in cross section of another embodiment of the fastening device according to this invention.
Figure 6:
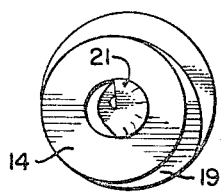
FIG. 6 is a top plan view of the fastening device shown in FIG. 5.

In the embodiment shown in FIGS. 5 and 6, the conical securing spiral consists of a wire 19 having the rectangular cross-section and a sharpened end point 20 at its base end. The top section 21 of the helical wire 19, is secured into an aperture 16a in the permanent magnet 14 by conventional means such as welding, or soldering.

Figure 7:
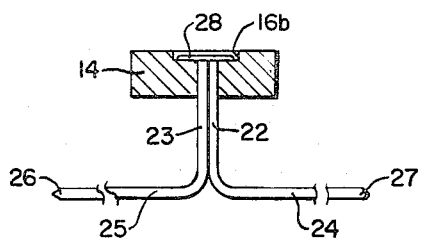
FIG. 7 is an elevation view partly in section of yet another embodiment of the present invention.

Referring now to FIG. 7, there is shown therein yet another embodiment of the magnetic fastening device, in which the means for securing the magnet to the insulation paneling comprise two vertically disposed wires 22 and 23 which are bent to form two laterally extending wires 24 and 25, respectively, which extend in opposite directions, each having, respectively, pointed ends 26 and 27. The wires 22, 23 extend through a bore 16b through magnet 14, and are secured therein by means of a securing element 28, which is connected to the upper ends of wires 22 and 23 and to the inner surface of countersunk portion of the magnet 19.

To fasten this magnetic fastening device to the insulating paneling, the vertical wires 22 and 23 pierce through the insulation panel and the extending ends are bent laterally as shown in FIG. 7 to secure the magnetic fastening means within the insulation.

While I have shown several embodiments of my invention, it is not my intention to have the scope of my invention defined thereby but rather my invention should be defined by the scope of the claims which are appended below.

What I claim is:

1. A fastener for mounting panels of relatively soft material to structures of ferromagnetic material, comprising a magnetic head, and a conically shaped wire spiral firmly attached at its vertex to said magnetic head and adapted to be screwed into said panels.

2. The fastener as recited in claim 1 wherein the diameter of the base of said conical wire spiral is larger than the diameter of said magnetic head.

3. The fastener as recited in claim 1 wherein said magnetic head comprises a permanent magnet.

4. The fastener recited in claim 3 wherein said permanent magnet is in the form of a circular disc having an aperture therethrough in which the vertex of said conical wire spiral is attached.

5. A fastener as recited in claim 1 wherein, said conical wire spiral comprises a wire of circular cross-section the lower end thereof being pointed and the upper end thereof being secured to said magnetic head.

6. A fastener as recited in claim 1 wherein said conical wire spiral comprises a wire of rectangular cross-section having a sharpened point at the lower end thereof, the upper end thereof being secured to said magnetic head.

References Cited

UNITED STATES PATENTS

| | | | |
|---|---|---|---|
| 752,925 | 2/1904 | Ryan | 24—112 |
| 1,085,956 | 3/1914 | Weber | 24—112 |
| 1,189,695 | 7/1916 | Jolak | 24—112 X |
| 2,514,939 | 7/1950 | Crary | 24—153 |
| 2,521,885 | 9/1950 | Vasquez | 292—251.5 |
| 2,742,250 | 4/1956 | Cronberger | 24—201.2 |
| 2,984,510 | 5/1961 | Hoffmann | 292—251.5 X |
| 3,041,694 | 7/1962 | Hansen | 24—112 X |
| 3,121,977 | 2/1964 | Bersudsky | 50—271 |
| 3,178,784 | 4/1965 | Krauthamer | 24—10 |

DONALD A. GRIFFIN, *Primary Examiner.*

OTHELL M. SIMPSON, *Examiner.*

G. WEIDENFELD, *Assistant Examiner.*